U. WEDGE.
METALLURGICAL FURNACE
APPLICATION FILED MAY 11, 1911

1,086,494.

Patented Feb. 10, 1914
2 SHEETS—SHEET 1.

WITNESSES
Hamilton T. Turner
Kate A. Beadle

INVENTOR
UTLEY WEDGE
BY HIS ATTORNEY
Harry Smith

U. WEDGE.
METALLURGICAL FURNACE.
APPLICATION FILED MAY 11, 1911.

1,086,494.

Patented Feb. 10, 1914
2 SHEETS—SHEET 2.

WITNESSES
Hamilton J. Turner
Kate A. Beadle

INVENTOR
UTLEY WEDGE
BY HIS ATTORNEY
Harry Smith

UNITED STATES PATENT OFFICE.

UTLEY WEDGE, OF ARDMORE, PENNSYLVANIA.

METALLURGICAL FURNACE.

1,086,494. Specification of Letters Patent. Patented Feb. 10, 1914.

Application filed May 11, 1911. Serial No. 626,516.

*To all whom it may concern:*

Be it known that I, UTLEY WEDGE, a citizen of the United States, and a resident of Ardmore, Pennsylvania, have invented certain Improvements in Metallurgical Furnaces, of which the following is a specification.

My invention relates to that class of metallurgical furnaces which have a plurality of treating chambers, the object of my invention being to make effective use of the electric current as a means of maintaining or aiding in the maintenance of the heat of said furnace. This object I attain in the manner hereinafter set forth, reference being had to the accompanying drawings, in which—

Figure 1:
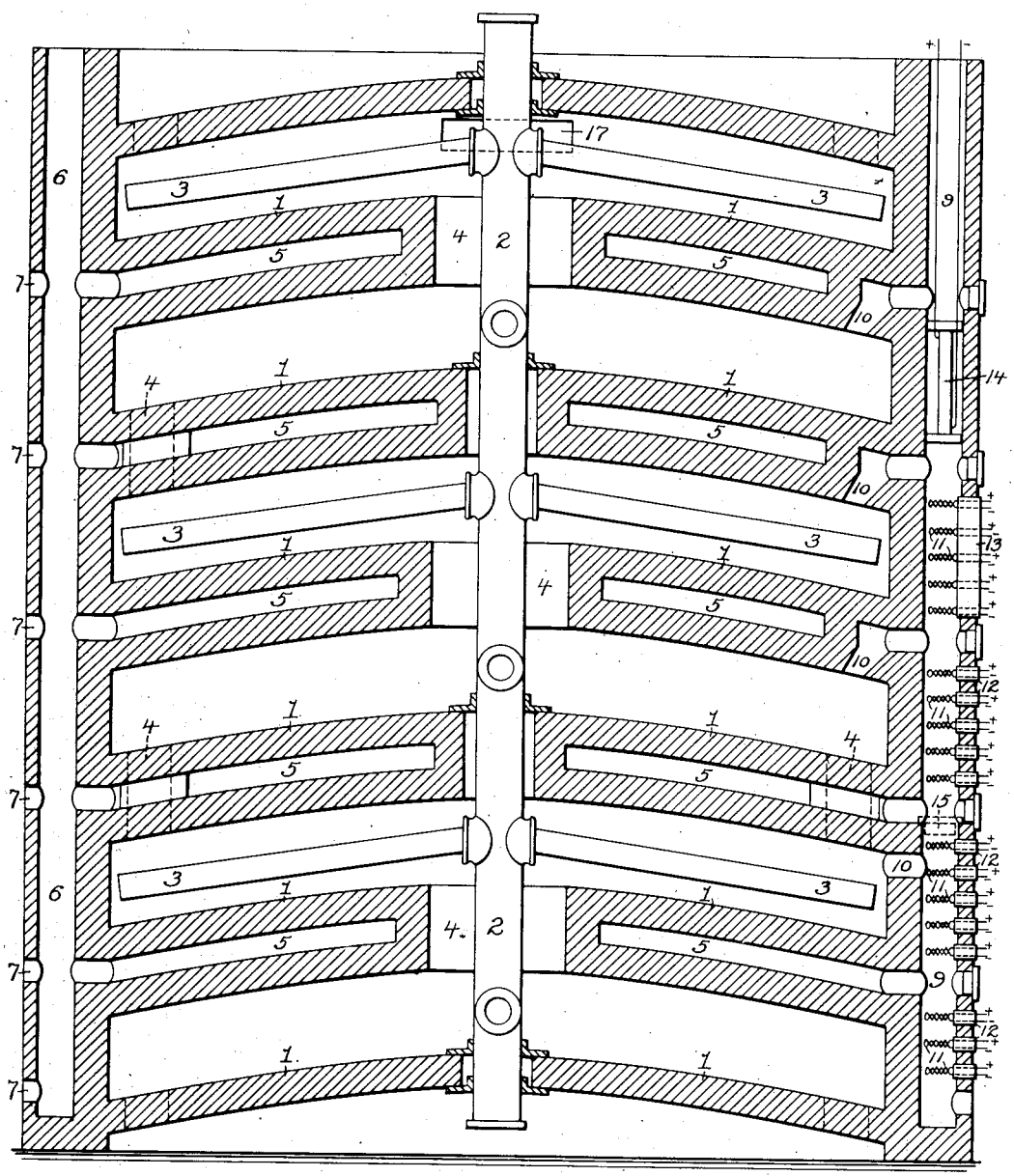
Figure 2:
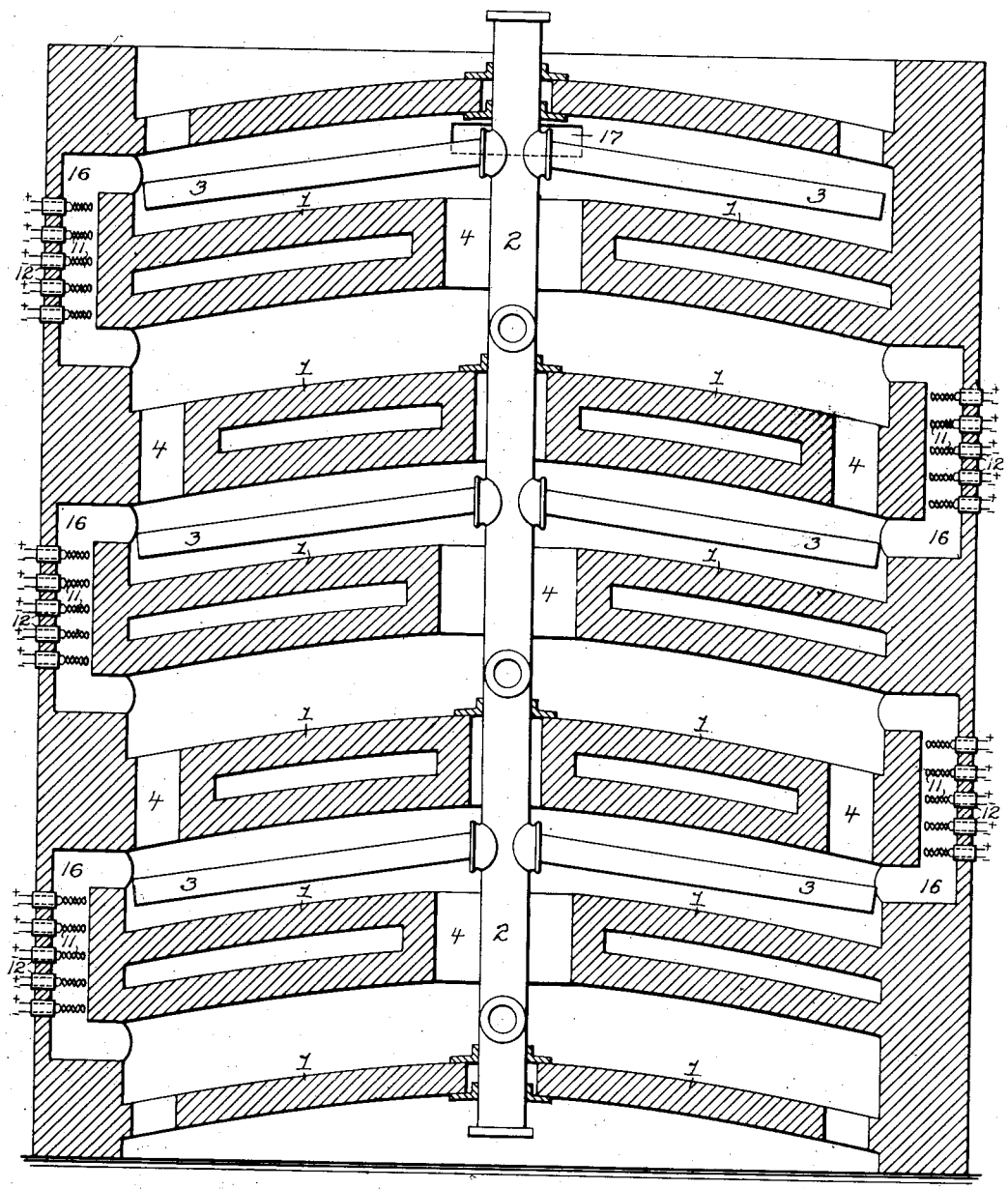

Figure 1 is a vertical sectional view of a furnace of the superposed hearth type illustrating one application of my invention, and Fig. 2 is a similar section of a like type of furnace illustrating another application of my invention.

Although my invention is not specifically limited to that type of furnace, I have illustrated it in connection with a furnace having a series of superposed treating hearths 1, and a central shaft 2 provided with projecting arms 3 which are intended to be provided with the usual rabbles or blades whereby the material under treatment is fed across each hearth from the outside to the inside or from the inside to the outside of the latter, suitable openings 4 being provided for the passage of the material from each hearth onto the hearth below and for the discharge of the material from the lowermost hearth.

In the furnace shown in Fig. 1 the roof of each treating chamber is hollow so as, to provide a chamber 5 to which air is admitted from a vertical flue 6 at one side of the furnace, this flue having a number of openings 7 through any one or more of which air may be admitted thereto. This air is heated in its passage through the chambers 5 from one side of the furnace to the other, where it enters a flue 9 and from the latter passes through openings 10 into any desired number of treating chambers of the furnace. It sometimes happens, however, that the air is not sufficiently heated in its passage through the chambers 5 and in order to increase the heat of the air before it enters the treating chambers of the furnace, I provide the flue 9 with a number of electric heaters whereby the air may be thoroughly heated before it enters the treating chambers of the furnace. These heaters may consist of resistance coils 11 carried by insulating blocks 12 inserted through openings in the side wall of the furnace so as to be individually removable laterally, or a series of such resistance coils may be carried by a single insulating block 13 so that the entire series is removable as a unit, or the electric heating device may consist of a resistance wire or ribbon 14 removable vertically from the flue 9, these electrical resistance devices becoming highly heated when the current is passed through the same and serving to increase the temperature of the air flowing past the same in order to insure the heating of the air to the proper temperature before it enters the treating chambers of the furnace.

The flue 9 may be in communication with all of the heating chambers 5, or the said flue 9 may be closed at intervals by means of blocks or plugs 15, as shown by dotted lines, so that air heated by passage through one of the heating chambers 5 may be directed past the electrical heating devices and caused to enter the treating chamber above or below the same.

The side wall of the furnace may have a number of openings communicating with the flue 9 and air may be admitted to said flue through any one or more of these openings, so as to be heated by the electric resistance device in the flue, such supply or supplies of air being used either independently of the supply of air admitted to the flue from the heating chambers 5 or in conjunction with such heated air supply.

The electrical heating devices may also be employed for the purpose of increasing the temperature of the gases passing from one heating chamber to another, for instance, in Fig. 2, I have shown a furnace in which the treating chambers are connected by flues 16 each containing an electric device or devices for raising the temperature of the gases flowing past the same.

In either furnace, the gases escape from the uppermost treating chamber by any suitable means, as for instance, by means of a flue 17.

I claim:—

1. A furnace having a series of superposed treating chambers, a flue connecting said chambers with one another, and electrical heating devices interposed in said flue between successive chambers of the furnace.

2. A furnace having a series of treating chambers, air heating chambers interposed between the same, a flue communicating with said treating chambers, and also with the air heating chambers, an electric heating device contained in said flue, and means whereby air on its way to the treating chambers is caused to flow first through the interposed heating chambers and then through the flue containing the electric heating device.

3. A furnace having a series of treating chambers, air heating chambers interposed between the same, a flue communicating with said treating chambers, and also with the air heating chambers, an electric heating device contained in said flue, and means whereby air on its way to the treating chambers is caused to flow first through the interposed heating chambers and then through the flue containing the electric heating device, the latter flue also having means for supplying air thereto independently of that derived from the air heating chamber.

4. A furnace having a flue therein, an electrical heating device contained in said flue, and a plug carrying said electrical heating device and closing an opening in the wall of the flue, said plug being of greater cross sectional area than said electrical heating device, whereby the latter can be readily introduced into or removed from the flue by applying the plug to or withdrawing it from the opening in the wall of said flue.

In testimony whereof, I have signed my name to this specification, in the presence of two subscribing witnesses.

UTLEY WEDGE.

Witnesses:
KATE A. BEADLE,
HAMILTON D. TURNER.